United States Patent
Iwasaki et al.

(10) Patent No.: US 8,545,955 B2
(45) Date of Patent: Oct. 1, 2013

(54) DISPLAY STRIP AND PRODUCT ASSEMBLY

(75) Inventors: Yoshio Iwasaki, Ritto (JP); Masako Mizumoto, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 289 days.

(21) Appl. No.: 12/918,049

(22) PCT Filed: Feb. 24, 2009

(86) PCT No.: PCT/JP2009/053258
§ 371 (c)(1),
(2), (4) Date: Aug. 17, 2010

(87) PCT Pub. No.: WO2009/107600
PCT Pub. Date: Sep. 3, 2009

(65) Prior Publication Data
US 2010/0307993 A1    Dec. 9, 2010

(30) Foreign Application Priority Data
Feb. 27, 2008    (JP) ................................. 2008-045543

(51) Int. Cl.
*B32B 33/00*    (2006.01)
(52) U.S. Cl.
USPC .......................... 428/40.1; 428/35.2; 428/200
(58) Field of Classification Search
USPC ....................... 428/35.2, 40.1, 200
See application file for complete search history.

(56) References Cited

U.S. PATENT DOCUMENTS

| 7,629,044 B2 | 12/2009 | Iwasaki | 428/343 |
| 2006/0163183 A1 | 7/2006 | Iwasaki | 211/113 |
| 2007/0092677 A1* | 4/2007 | Iwasaki et al. | 428/40.1 |

FOREIGN PATENT DOCUMENTS

| EP | 1 394 043 A1 | 3/2004 |
| EP | 1 857 376 A1 | 11/2007 |
| JP | 2003-312718 | 11/2003 |
| JP | 2004-255784 | 9/2004 |
| JP | 2005-124828 | 5/2005 |
| WO | 02/051630 A2 | 7/2002 |
| WO | WO 2004/054895 A1 | 7/2004 |

OTHER PUBLICATIONS

Extended European Search Report and Opinion issued on Mar. 15, 2012 by EPO.

* cited by examiner

*Primary Examiner* — Gerard Higgins
*Assistant Examiner* — Sathavaram I Reddy
(74) *Attorney, Agent, or Firm* — Hogan Lovells US LLP

(57) ABSTRACT

[Problem to be solved]
To obtain a display strip to which bags can be attached with sufficient holding force and from which the bags can be removed smoothly, keeping the removed surface of the bag clean.
[Solution]
The display strip for arranging and attaching a plurality of product-enclosed bags comprises a laminate having at least a substrate layer and a sealant layer,
wherein the sealant layer comprises an olefin resin layer [(a) layer] containing no polymer grafted with a vinyl monomer and an easily peelable resin layer [(b) layer] containing an olefin-based polymer grafted with a vinyl monomer, and the (a) layer is the outermost layer of the display strip.

1 Claim, 2 Drawing Sheets

DISPLAY STRIP AND PRODUCT ASSEMBLY

CROSS-REFERENCE TO THE RELATED APPLICATIONS

This application is a national stage of international application No. PCT/JP2009/053258, filed on Feb. 24, 2009, and claims the benefit of priority under 35 USC 119 to Japanese Patent Application No. 2008-045543, filed on Feb. 27, 2008, the entire contents of which are incorporated herein by reference.

TECHNICAL FIELD

The present invention relates to a display strip for arranging and attaching a plurality of bags filled with products such as foods and the like for display and sale, and a product assembly comprising the display strip with a plurality of products attached thereto and the bags filled with the products.

BACKGROUND ART

In stores, there have been already known the display and sale system for suspending a strip-shaped display strip with bags filled with products arranged and attached thereto, not for arranging bags filled with foods such as snack foods and the like on a display shelf. This display and sale system has attracted attention because it does not require much space in stores compared with the system of displaying food packaging bags on a shelf for sale. Patent document 1 discloses a display strip comprising a film having excellent mechanical properties, such as a biaxial oriented polymer film, as a substrate layer and a film having both heat sealing property and easy peeling property as a sealant layer, wherein these films are laminated. When the bag attached to the display strip is removed, stringing occurred, thereby causing problems that the bag can not be smoothly removed and the removed surface of the bag is not clean.

Patent document 1: Japanese Patent No. 4018053

DISCLOSURE OF THE INVENTION

Problem to be Solved by the Invention

Therefore, the object of the present invention is to obtain a display strip to which bags can be attached with sufficient holding force and from which the bags can be removed smoothly, keeping the removed surface of the bag clean.

Means for Solving the Problems

The above-mentioned problem can be solved by obtaining a display strip for arranging and attaching a plurality of product-enclosed bags, which comprises a laminate having at least a substrate layer and a sealant layer, wherein the sealant layer comprises an olefin resin layer (a layer) containing no polymer grafted with a vinyl monomer and a resin layer (b layer) containing an olefin-based polymer grafted with a vinyl monomer and having an easy peeling property, and the (a) layer is the outermost layer of the display strip (which is the first constitution of the present invention).

It is preferable that the (a) layer comprises a resin layer containing a polymer of α-olefin having 4 to 12 carbon atoms or a copolymer of ethylene and/or propylene with α-olefin having 4 to 12 carbon atoms. It is preferable that the α-olefin having 4 to 12 carbon atoms is 1-butene.

It is preferable that the (b) layer is a resin layer containing an olefin resin grafted with styrene which is formed by graft polymerization of an olefin-based polymer with styrene. And, it is preferable that the (b) layer is a resin layer containing a polyolefin, an olefin-based polymer grafted with styrene, and a polystyrene.

It is preferable that the (b) layer is a resin layer containing a polymer of α-olefin having 4 to 12 carbon atoms or a copolymer of ethylene and/or propylene with α-olefin having 4 to 12 carbon atoms.

Furthermore, the second constitution of the present invention is a product assembly for suspending a display strip with a plurality of product-enclosed bags arranged and attached thereto for display and sale of products, wherein a plurality of the bags are attached to the display strip by heat sealing, the bag comprises a laminated film whose outermost layer is a biaxial oriented polypropylene film, the display strip comprises a laminate having at least a substrate layer and a sealant layer for attaching the bag, the sealant layer comprises an olefin resin layer (a layer) containing no polymer grafted with a vinyl monomer and a resin layer (b layer) containing an olefin-based polymer grafted with a vinyl monomer and having an easy peeling property, the (a) layer is the outermost layer of the display strip, and the outermost layer of the bag is attached to the (a) layer of the display strip by heat sealing.

Effect of the Invention

According to the present invention, when a purchaser removes a bag from the display strip, the bag can be smoothly removed therefrom without opaque matters adhered on the removed surface of the bag. Furthermore, the bag is attached to the display strip with sufficient holding force, thereby having a beneficial effect in that no troubles are caused during a transfer process from a factory to a store, a process of display and sale in the store.

Additionally, even if the outermost layer of the bag comprises a biaxial oriented polypropylene film having no heat sealable layer, the bag can be easily attached to the display strip of the present invention by heat sealing. Therefore, bags commonly used now can be attached to the display strip, thereby enabling to contribute to the spread of the display method using the display strip.

Figure 1:
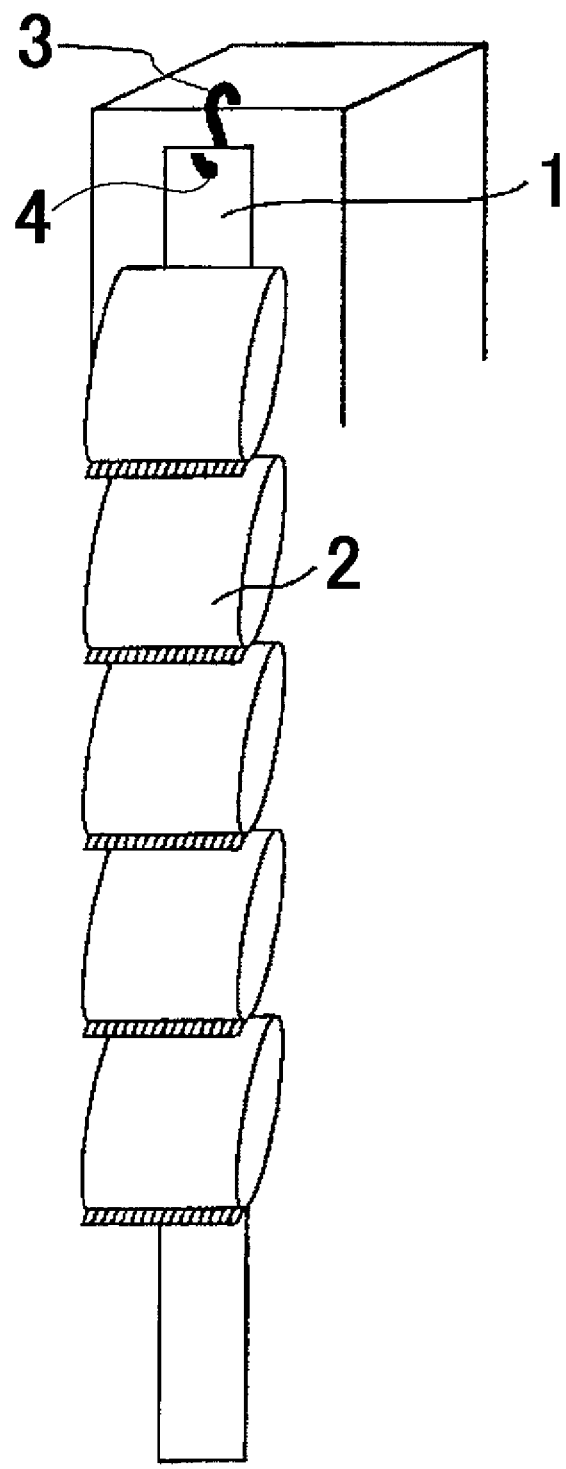
FIG. 1 is a view showing an example of display using the display strip.

DESCRIPTION OF THE REFERENCE NUMERALS 1 display strip
2 product-enclosed bag

BEST MODE FOR CARRYING OUT THE INVENTION

Basic Constitution of Display Strip

As shown in FIG. 1, a display strip 1 of the present invention usually has a slender strip shape so that a plurality of bags 2 filled with foods such as snack foods and the like are arranged and attached thereto for display and sale. The display strip 1 is provided with a body part capable of attaching the bags and a hole part (pore) 4 for hanging and suspending on a hook 3 and the like on the body part, but it is not limited to this. Any shapes may be employed as long as product-enclosed bags can be arranged and attached to the display strip for display and sale.

In the present invention, the display strip of the present invention has at least a substrate layer providing basic performance as a strip and a sealant layer allowing the bags to be attached by heat sealing because the attachment of the product-enclosed bags is carried out by heat sealing. A film constituting the substrate layer and a film constituting the sealant layer are laminated and integrated by the usual lamination technique. Furthermore, if required, an adhesive layer may be formed between the substrate layer and the sealant layer so that the bag once removed at the point of sale can be reattached, or a print layer for providing merchandise information may be formed.

(Basic Constitution of Product Assembly)

In the present invention, the product assembly comprises a display strip and product-enclosed bags attached to the display strip for the purpose of being displayed and sold in supermarkets, stores and the like. The product-enclosed bags are initially attached to the display strip by heat sealing. However, the bag once removed at the point of sale may be reattached to the display strip by an adhesive agent.

(Substrate Layer of Display Strip)

As described above, in the display strip of the present invention, the substrate layer needs to have properties required as a display strip, such as strength properties allowing many bags to be suspended and removed from the display strip, heat resistance allowing the bags to be attached by heat sealing, and the like. Therefore, for example, there can be used a biaxial oriented polypropylene film, a biaxial oriented polyamide film, a biaxial oriented polyester film, metal foil, paper, a laminate of these or the like. It is preferable that the thickness of the substrate layer is usually 20 to 200 µm. When the thickness is less than 20 µm, the substrate layer may have insufficient strength. When the thickness exceeds 200 µm, heat may not be fully transmitted to the sealant layer because heat is provided through the substrate layer surface during attaching the bags by heat sealing. The above-mentioned substrate layer may comprise only one layer, but may be multi-layered with two or more layers. In particular, fiber layers such as a woven cloth, a non-woven cloth, a split cloth and the like can be introduced into the periphery of the hole part or the whole substrate layer as a reinforcing material for reinforcing the periphery of the hole part to be hooked on the hook, if required.

(Sealant Layer of Display Strip)

In the present invention, the sealant layer is formed on the above substrate layer to enable attachment of the product-enclosed bags to the display strip by heat sealing. It is preferable that the sealant layer is formed of a low melting point polymer having a heat sealing property. However, the following points are further required:

(1) The bags attached to the display strip need to be retained so as not to fall off from the display strip in the process in which the bags are transferred to a store, suspended and sold in the store.

(2) On the other hands, when the bag is removed at the point of sale, it is required that the bag can be smoothly removed by a purchaser and the removed surface of the bag is clean without leaving opaque resins on the surface.

The above-mentioned two points have been considered in the conventional art, but a sealant layer satisfying the two points could not have been obtained. In the present invention, the sealant layer comprises an olefin resin layer [(a) layer] containing no polymer grafted with a vinyl monomer and a resin layer [(b) layer] containing an olefin-based polymer grafted with a vinyl monomer and having an easy peeling property, wherein the (a) layer is the outermost layer of the display strip. Thus, the bag can be held on the display strip because the bag is strongly adhered due to the (a) layer, and when the bag is removed, it can be easily removed from the display strip due to the (b) layer arranged below the (a) layer as well as opaque resin layer(s) is not adhered to the removed surface of the bag.

(Thickness of Sealant Layer)

In the sealant layer of the present invention, the (a) and (b) layers preferably have a thickness falling within the range of 10 to 80 µm, respectively, wherein the total thickness of the (a) layer and (b) layer of the sealant layer is preferably within the range of 2.0 to 100 p.m. When the thickness is less than 20 µm, sufficient adhesion can not be obtained, and when the thickness exceeds 200 µm, it becomes excessive, resulting in a high cost. In the present invention, it is preferable to use a film constituting the (a) layer and a film constituting the (b) layer, which are previously laminated, because the display strip can be easily manufactured. The sealant layer may be formed on all over the surface of the display strip or may be formed partly in the present invention. Furthermore, the sealant layer may be further multi-layered in addition to the (a) layer and the (b) layer in the present invention.

(Adhesive Layer of Display Strip)

In the display strip of the present invention, it is preferable that there is provided an adhesive layer between the sealant layer and the substrate layer because the purchaser may want to return the bag once removed to the display strip at the point of sale. For forming the adhesive layer, the technique disclosed in Patent document 2 is applicable in the present invention as well.

Patent document 2: Japanese Patent No. 3973661

(Sealant Layer of Display Strip: (a) Layer)

As the olefin resin forming the (a) layer of the sealant layer of the display strip, a resin layer containing a polymer of α-olefin having 4 to 12 carbon atoms, a copolymer of ethylene and/or propylene with α-olefin having 4 to 12 carbon atoms is preferably used in the present invention. Particularly, in the present invention, the α-olefin having 4 to 12 carbon atoms is contained in the resin component, thereby enabling to obtain an olefin-based polymer having a low melting point. Therefore, even if the outermost layer of the bag is formed of a biaxial oriented polypropylene film having no heat sealable layer, a resin layer which is sufficiently heat sealable can be obtained.

Examples of the α-olefin having 4 to 12 carbon atoms include 1-butene, 3-methyl-1-butene-pentene, 4-methyl-1-butene-pentene, 1-hexene, 1-heptene, 1-octene, 1-decene, 1-octadecene, 1-dodecene, and the like. In particular, 1-butene is preferably used. These may be further copolymerized with vinyl acetate, (meth)acrylic acid, (meth)acrylate, and the like.

Specifically, preferred examples of the α-olefin having 4 to 12 carbon atoms include a butene-based polymer, a copolymer of ethylene or propylene with butene, and the like. Examples of the ethylene-based polymer include a linear low density polyethylene, a high density polyethylene. An example of the ethylene-based polymer or propylene-based polymer includes a polymer obtained by copolymerizing mainly ethylene, propylene with a small amount of other α-olefins (1-butene, 1-pentene, 1-hexene, etc.).

(Sealant Layer of Display Strip: (b) Layer)

In the present invention, the (b) layer comprises a resin layer containing an olefin-based polymer grafted with a vinyl monomer and having an easy peeling property. It has been known by Patent document 1 that when the sealant layer of the display strip is an easily peelable layer, the bag can be removed without any damages. However, the commercial value of the bag is deteriorated by the display strip disclosed by Patent document 1 because opaque resins are adhered to the removed surface of the bag when the bag is removed from the display strip. The present invention satisfies both of holding force and removing property due to the (a) layer which provides secure attachment and the (b) layer which exhibits an easy peeling property. Also, the (a) layer is transparent because it comprises only an olefin resin layer and the (b) layer has a transparency because graft segments are micro-dispersed in the resin layer due to a cohesive failure component formed of the graft polymer. For this reason, the (a) layer polymer and a part of the (b) layer polymer are adhered to the removed surface of the bag, but the transparency can be maintained.

In the present invention, examples of the vinyl monomer can include aromatic vinyl compounds such as styrene, α-methyl styrene and the like, vinyl esters such as vinyl acetate and the like, (meth)acrylates such as methyl(meth)acrylate, n-butyl(meth)acrylate, hexyl(meth)acrylate and the like. Among them, it is preferable to use the aromatic vinyl compounds, particularly, styrene.

In the present invention, examples of the olefin-based polymer include polyethylene, polypropylene, the above-mentioned polymer of α olefin having 4 to 12 carbon atoms or copolymer of ethylene and/or propylene with the α olefin having 4 to 12 carbon atoms. Among them, the polymer of α olefin having 4 to 12 carbon atoms or copolymer of ethylene and/or propylene with α olefin having 4 to 12 carbon atoms is preferable. In the present invention, the olefin-based polymer used for the (b) layer may be the same as or different from the olefin-based polymer of the (a) layer.

In the present invention, the graft polymer can be formed by dissolving a radical generating agent in an aqueous suspension of the olefin-based polymer, adding the vinyl monomer, immersing the vinyl monomer into the olefin-based polymer, followed by heating to perform graft polymerization of the olefin-based polymer with the vinyl monomer. The reactant obtained by graft polymerization is a mixture of the graft polymer, the olefin-based polymer which does not participate in the graft polymerization, a homopolymer of the vinyl monomer. The graft segments and the homopolymer of the vinyl monomer act as a cohesive failure component and the olefin-based polymer part acts as an adhesive component. In the present invention, the graft segments (dispersed phase) are micro-dispersed in the adhesive component (continuous phase). Therefore, when the bag is removed from the display strip, the (a) layer and a part of the (b) layer of the sealant layer are adhered to the bag surface, but they are transparent, thereby not impairing the appearance of the bag. It is preferable that, with regard to the ratio of the olefin-based polymer to the vinyl monomer, the olefin-based polymer is present within the range of 40 to 70% by weight and the vinyl monomer is present within the range of 60 to 30% by weight.

(Production of Display Strip)

The display strip of the present invention is preferably produced by laminating a substrate constituting the substrate layer, such as a biaxial oriented film or the like, and a film constituting the sealant layer. The lamination of the substrate serving as the substrate layer and the film constituting the sealant layer is carried out by a sandwich-lamination via a polyethylene resin and a dry lamination using an adhesive layer.

In the case where the adhesive layer is provided between the substrate layer and the sealant layer, it is preferable that the adhesive layer is formed on the substrate layer and the sealant layer film is laminated thereon, as described in Patent document 2. In order to improve the release properties between the adhesive layer and the sealant layer, silicone resins are preferably applied on the surface of the sealant layer film.

In the present invention, the sealant layer is formed of the (a) layer and the (b) layer. However, it is preferable to use a film in which the (a) layer and the (b) layer are previously laminated and integrated. Also, it is possible to laminate the (b) layer on the substrate layer and the (a) layer thereon.

In the present invention, if a woven cloth, a split cloth (warifu), a non-woven cloth and the like are introduced into the substrate layer, it is preferable that the above clothes and the like are laminated on the film constituting the substrate layer, paper and the like, and the sealant layer is laminated thereon.

(Basic Constitution of Bag)

As the bag to be attached to the display strip in the present invention, it is preferable to use a bag whose outermost layer is formed of a polypropylene film, particularly, a biaxial oriented polypropylene film. Since a bag filled with snack foods and the like is usually formed of a biaxial oriented polypropylene film, the display strip of the present invention can be widely used in a normal supermarket, a convenience store, a grocery shop or a station stall.

As the bag filled with foods such as snack foods and the like, a bag produced by a vertical/horizontal pillow packaging machine, particularly, a vertical pillow packaging machine is used, but not limited to this. The bag for packaging foods usually comprises a substrate layer providing mechanical properties such as strength and the like, a sealant layer providing a sealing performance for forming the bag, a barrier layer providing oxygen barrier property and water vapor barrier property for maintaining food quality and a print layer indicating article information, but the bag is often formed of a packaging film having a laminated structure in which individual substrates are laminated in the following order from the inner surface side of the bag to the surface side of the bag: sealant layer/barrier layer/print layer/substrate layer. The lamination between the respective layers is carried out by a sandwich lamination via polyethylene and by dry lamination using an adhesive agent. For forming the barrier layer, metal (aluminum) vapor deposition or oxide (silicon oxide, aluminum oxide, etc.) vapor deposition is commonly used. The bag comprises the sealant layer of 20 to 100 μm and the substrate layer of 20 to 100 μm, and the total thickness of the bag is 40 to 150 μm, preferably 50 to 100 μm.

(Sealant Layer of Bag)

The sealant layer of the bag used in the present invention is arranged on the inner surface side of the bag and heat sealed at the prescribed site, thereby forming a bag. The polymer constituting the sealant layer can be selected from the known technique and there are generally used cast polypropylene, heat sealable biaxial oriented polypropylene, linear low density polyethylene, an ethylene-propylene copolymer and the like.

(Substrate Layer of Bag)

It is most preferable to use a bag having an outermost surface comprising polypropylene, particularly, a biaxial oriented polypropylene film for the display strip of the present invention, but biaxial oriented polyester, biaxial oriented polyamide may be also used. In the case where the sealant layer of the display strip is formed of an olefin-based polymer having 2 to 3 carbon atoms, such as cast polypropylene, linear low density polyethylene, an ethylene-vinyl acetate copolymer, an ethylene-propylene copolymer or the like, the bag whose outermost surface layer comprises oriented polymer film(s) such as a biaxial oriented polypropylene film or the like does not have an adhesion property, and therefore could not be attached to the display strip by heat sealing. For this reason, it was necessary to use a film having a low melting point heat sealable layer (such as a resin layer having heat sealing property, such as a propylene-ethylene-butene ternary copolymer, a thin polymer layer comprising a hot-melt polymer, or the like) for the biaxial oriented polypropylene film of the outermost surface of the bag. In the present invention, when a resin layer containing a polymer of α-olefin having 4 to 12 carbon atoms or a copolymer of ethylene and/or propylene with 4 to 12 carbon atoms is used as the (a) layer, the bag can be attached to the display strip by heat sealing even if the outermost surface of the bag comprises oriented film(s) such as a biaxial oriented polypropylene film having no heat sealable layer or the like. Therefore, any kind of bags can be attached to the display strip as long as a bag filled with general foods such as snack foods and the like is used, thereby resulting in that the display strip of the present invention has a wide application range to a large extent.

(Production of Bags)

The bag is produced by supplying the above-mentioned packaging film to a packaging machine, folding the film into the tubular shape with the both end surfaces sealed in the film longitudinal direction, filling with foods, forming horizontal seals thereon at the predetermined intervals and cutting the obtained film. In the present invention, the bag constituting the product assembly is not limited to the above. Any bag may be used as long as the bag is produced by a known technique and attachable to the display strip by heat sealing.

(Attachment of Bags to Display Strip)

The attachment of the bags enclosing foods and the like to the display strip of the present invention can be carried out by using a known applicator. An example of the known applicator includes an apparatus as disclosed in Patent document 3, but not limited to this. It is preferable in terms of efficiency in the production process that the attachment of the bags to the display strip is carried out continuously with the bag-making packaging process as disclosed in Patent document 3.

If the bags are attached to the display strip by the applicator disclosed in Patent document 3, heat sealing is carried out by holding both side ends of the upper portion of the packaging bag with arms of the applicator, moving the upper end portion of the bag to the prescribed site of the display strip supplied onto a heater surface, and pressing the overlapped part of the display strip with the upper end portion of the bag with a pressing body from above. For effective heat sealing, the temperature of the heater surface is higher than the melting point of the sealant layer polymer and in view of heat resistance of the substrate layer of the display strip, within the range of 160 to 220° C. and the sealing time is approximately 200 to 800 msec.

In the display strip of the present invention, when the (a) layer of the sealant layer comprises a low melting point polyolefin which has a melting point of not more than 140° C. and whose main component is poly-1-butene and the like, the bag having an outermost layer comprising a biaxial oriented polypropylene film can be easily and promptly attached to the display strip.

Figure 2:
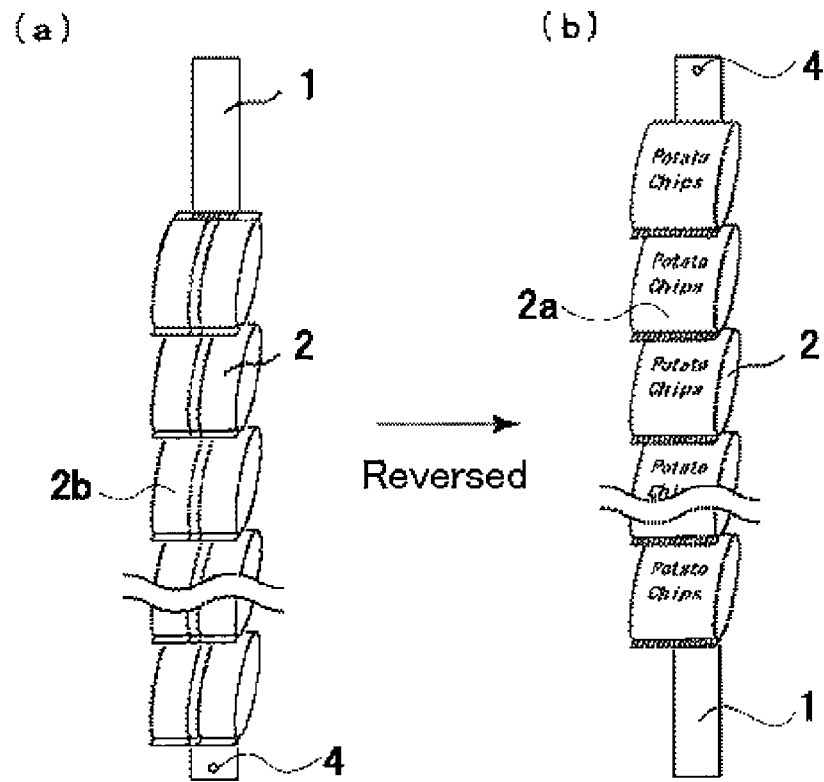
FIGS. 2(a) to 2(c) are views showing an aspect when the bag attached to the display strip of the present invention is removed.
Figure 2:
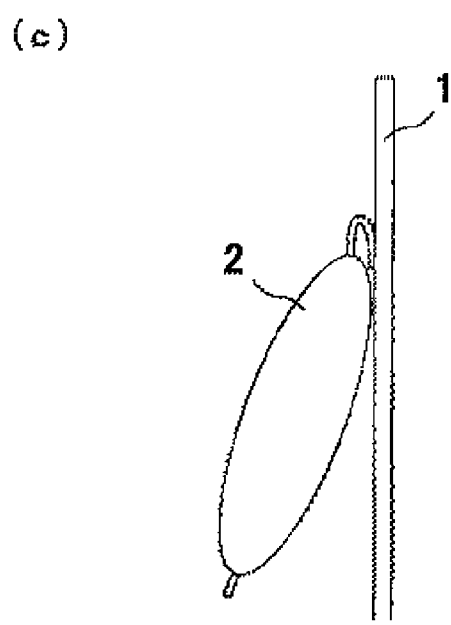

The bag is attached to the display strip 1 as shown in FIG. 2a. That is, the bag 2 is attached to the display strip 1 with a hole part 4 of the display strip 1 down and a rear surface 2b of the bag 2 facing upward. After that, the display strip 1 is turned upside down to direct the hole part 4 upward and the bag 2 is also reversed to have a surface 2a facing upward, as shown in FIG. 2b, and then it is attached to the hook 3 for display. This allows the upper end part of the bag 2 to be attached to the display strip 1 in the form as shown in FIG. 2c. Therefore, the bag can be easily removed from the display strip by grabbing and pulling the bag 2 downward.

Patent document 3: Japanese Patent No. 3830437

Hereinafter, the present invention will be described more specifically by Examples. However, the scope of the present invention is not limited by these Examples.

Example 1

A heat sealable resin layer (a layer) and an easily peelable resin layer (b layer) are laminated, where the (a) layer is a film whose main component is a 1-butene polymer and the (b) layer is a film formed of a resin composition comprising a propylene/ethylene copolymer, a propylene/ethylene copolymer grafted with styrene and polystyrene, and thus a sealant layer film (having a thickness of 30 μm) is prepared.

A biaxial oriented polyethylene terephthalate film (thickness: 50 μm) [substrate layer] is laminated with the sealant layer film (thickness: 30 μm) by a dry lamination method, followed by cutting it into 35 mm width, thereby preparing a display strip.

To this display strip, bags having a structure of a biaxial oriented polypropylene film (thickness: 20 μm)/polyethylene (thickness: 13 μm)/VM-polyethylene terephthalate film (thickness: 12 μm)/polyethylene (thickness: 13 μm)/cast polypropylene film (CPP) are attached by heat sealing. The attachment is carried out by using a F-SPA machine manufactured by ISHIDA CO., LTD. and the heat sealing is carried out under the condition where the sealing temperature is 200° C. and sealing time is 500 msec.

Example 2

A biaxial oriented polyester film (thickness: 50 μm) is laminated with a sealant film (SMX-1015L manufactured by J-Film Corporation) (thickness: 30 μm) by a sandwich lamination via polyethylene, thereby preparing a laminated film. This is subjected to slit processing into a 35 mm width, thereby obtaining a display strip. The bags are attached to the display strip as in Example 1 and evaluated.

Comparative Example 1

A biaxial oriented polyethylene terephthalate film (thickness: 50 μm) [substrate layer] is laminated with a cast polypropylene (CPP) film (thickness: 30 μm) (manufactured by TOHCELLO CO., LTD.) [sealant layer], followed by cutting it into 35 mm width, thereby obtaining a display strip. A product assembly is prepared by using this display strip as in Example 1.

Comparative Example 2

A biaxial oriented polyethylene terephthalate film (thickness: 50 μm) [substrate layer] is laminated with a polyethylene/polypropylene blend-type of easily peelable sealant film (thickness: 30 μm) [sealant layer] by a dry lamination method, followed by cutting it into 35 mm width, thereby obtaining a display strip. A product assembly is prepared by using this display strip as in Example 1.

(Evaluation)

1. Measurement of Heat Sealing Strength

Measurement is made on the heat sealing strength between the display strip and the bag based on JISK 7127 (tensile test method of a plastic film and sheet). An average value of 10 measured values is shown in Table 1.

2. Evaluation of Suspension

The display strip with five bags (content amount: 100 g) attached thereto is suspended and tests for checking whether the bags fall or not are conducted.

3. Measurement results are shown in Table 1.

TABLE 1

|  | Average heat sealing strength (N) | Evaluation of suspension |
| --- | --- | --- |
| Example 1 | 23.9 | no falling of bags for 1 or more month. |
| Example 2 | 17.3 | same as above |
| Comparative Example 1 | not sealable | — |
| Comparative Example 2 | same as above | — |

4. Measured Results

The display strips in Examples 1 and 2 according to the present invention provide good results in comparison to Comparative Examples 1 and 2.

The invention claimed is:

1. A product assembly suspending a display strip with a plurality of product-enclosing bags arranged and attached for display and sale of products, wherein at least one bag of the plurality of the bags is attached to the display strip by heat sealing,
    wherein the at least one bag comprises a laminated film whose outermost layer is a biaxial oriented polypropylene film,
    wherein the display strip comprises a laminate having at least a substrate layer and a sealant layer for attaching the at least one bag,
    wherein the sealant layer comprises a first layer and a second layer,
    wherein the first layer is an olefin resin layer consisting essentially of an olefin resin and containing no polymer grafted with a vinyl monomer,
    wherein the second layer is a resin layer containing products obtained from graft polymerization, wherein the products comprise a mixture of a graft polymer, an adhesive component of an olefin-based polymer which is not involved in graft polymerization and a homopolymer of a vinyl monomer; wherein the graft polymer contains an olefin-based polymer grafted with the vinyl monomer and is micro-dispersed in the adhesive component of the olefin-based polymer;
    wherein the first layer is the outermost layer of the display strip, and
    wherein the outermost layer of the at least one bag is attached to the first layer of the display strip by heat sealing.

* * * * *